United States Patent [19]
Kani et al.

[11] Patent Number: 5,856,778
[45] Date of Patent: Jan. 5, 1999

[54] INTRUSION DETECTING APPARATUS FOR A VEHICLE

[75] Inventors: Hiroyuki Kani; Masahiro Goto; Ikuo Hayashi, all of Nishio; Takeo Tsuzuki, Toyota, all of Japan

[73] Assignees: Denso Corporation, Kariya; Nippon Soken Inc., Nishio

[21] Appl. No.: 808,518

[22] Filed: Feb. 27, 1997

[30] Foreign Application Priority Data

| Feb. 29, 1996 | [JP] | Japan | 8-043495 |
| Apr. 4, 1996 | [JP] | Japan | 8-082822 |
| Apr. 9, 1996 | [JP] | Japan | 8-086884 |

[51] Int. Cl.$^6$ .................................................. B60R 25/10
[52] U.S. Cl. .................... 340/426; 340/425.5; 367/93; 367/94; 307/10.2
[58] Field of Search ................. 340/426, 425.5; 367/93, 94; 180/287; 307/10.2

[56] References Cited

U.S. PATENT DOCUMENTS

| 3,629,812 | 12/1971 | Amato | 367/94 |
| 3,638,210 | 1/1972 | Hankins et al. | 340/507 |
| 3,801,977 | 4/1974 | Cotter | 367/94 |
| 3,828,336 | 8/1974 | Massa | 367/94 |
| 3,838,408 | 9/1974 | McMaster | 340/501 |
| 4,003,045 | 1/1977 | Stockdale | 367/94 |
| 4,012,730 | 3/1977 | Nicholls | 376/94 |
| 4,290,126 | 9/1981 | McFayden et al. | 367/93 |
| 4,929,925 | 5/1990 | Bodine et al. | 340/426 |
| 5,424,711 | 6/1995 | Kani | 340/426 |
| 5,483,219 | 1/1996 | Aoki et al. | 340/426 |

FOREIGN PATENT DOCUMENTS

| 473 835 | 3/1992 | European Pat. Off. . |
| 2 257 252 | 1/1993 | European Pat. Off. . |
| 48-38097 | 9/1946 | Japan . |
| 49-18597 | 6/1947 | Japan . |
| 48-66395 | 12/1947 | Japan . |
| 50-122200 | 9/1975 | Japan . |
| 51-16896 | 2/1976 | Japan . |
| 51-16897 | 2/1976 | Japan . |
| 54-99591 | 8/1976 | Japan . |
| 51-132099 | 11/1976 | Japan . |
| 52-24100 | 2/1977 | Japan . |
| 53-3799 | 1/1978 | Japan . |
| 55-119791 | 11/1980 | Japan . |
| 55-140987 | 11/1980 | Japan . |
| 57-39493 | 3/1982 | Japan . |
| 58-35693 | 3/1983 | Japan . |
| 6-52449 | 2/1994 | Japan . |
| 7-5062 | 1/1995 | Japan . |

*Primary Examiner*—Thomas J. Mullen, Jr.
*Assistant Examiner*—Ashok Mannava
*Attorney, Agent, or Firm*—Pillsbury Madison & Sutro LLP

[57] ABSTRACT

An intrusion detecting apparatus for a vehicle comprises: a doppler shift signal outputting unit for outputting a doppler shift signal in response to a reflected and received ultrasonic signal from an ultrasonic receiver and a transmitted ultrasonic signal from a transmitter, an envelope detecting circuit for detecting the level of the received ultrasonic signal, and a detecting means for detecting an illegal intrusion by a person only when it is determined that the doppler shift signal is within a predetermined amount corresponding to the movement of a person intruding into the passenger compartment and it is also determined that the detected level of the received ultrasonic signal is out of a range of a disturbance, whereby an erroneous detection due to a disturbance caused by some reason other than an intrusion can be prevented.

10 Claims, 15 Drawing Sheets

SAMPLED NUMBER M

INTRUSION DETECTING APPARATUS FOR A VEHICLE

BACKGROUND OF THE INVENTION

1. Field of the Invention

The present invention relates to an intrusion detecting apparatus for a vehicle, and more particularly to an intrusion detecting apparatus for a vehicle which is suitable to detect an illegal intrusion of a person by utilizing an ultrasonic doppler shift signal which is generated when a person intrudes into the passenger compartment of a vehicle.

2. Description of the Related Art

Conventionally, an intrusion detecting apparatus for a vehicle of this type is known as disclosed in, for example, Japanese Patent Publication (Kokoku) No. 7-5062.

In this publication, when an ultrasonic transmitter provided in a passenger compartment of the vehicle receives an output pulse signal from a pulse oscillator and transmits an ultrasonic signal into the passenger compartment of the vehicle, an ultrasonic receiver provided in the passenger compartment of the vehicle receives the ultrasonic signal which has been reflected by a person or the like in the passenger compartment of the vehicle. Then the received ultrasonic signal is mixed with the output pulse signal from the pulse oscillator, and the mixed signal is filtered by a low pass filter so that a doppler signal is output.

Then, the envelope of the doppler signal is detected by a detector. When the detected envelope signal is higher than a reference voltage, a comparator outputs a signal which is then integrated by an integrating circuit. Then, when the integrated output from the integrating circuit, that is an integration level of the compared signal with respect to time, reaches a predetermined level, it is detected that a person has illegally intruded.

By this construction, in order to detect an illegal intrusion of a person based on a doppler signal, the detecting circuit, the comparator and the integrating circuit are employed as mentioned above. Therefore, as long as the comparator outputs a signal as mentioned above, the integrating circuit integrates the compared signal even when the doppler signal is generated due to any other disturbance.

In other words, as long as the comparator outputs a compared signal due to, for example, air turbulence in the passenger compartment of the vehicle because a door of the passenger compartment of the vehicle is slightly open, the integrating circuit continues to integrate the compared signal. The air turbulence, i.e., disturbance, may be generated by air fluctuations in the passenger compartment or by movements of material bodies such as a figurine stuck on a window glass. Therefore, even when the integration level reaches the predetermined level, it may be erroneously detected that a person has illegally intruded.

Because of this, the user of this vehicle may make the intrusion detecting apparatus inoperative or may ignore an alarm generated by the erroneous detection.

SUMMARY OF THE INVENTION

As object of the present invention is to provide an intrusion detecting apparatus for a vehicle for preventing an erroneous detection due to a disturbance caused by some reason other than a person intruding into the vehicle.

To attain the above object, according to a first aspect of the present invention, there is provided an intrusion detecting apparatus for a vehicle comprising an ultrasonic transmitter, provided in a passenger compartment of a vehicle, for transmitting an ultrasonic signal to be reflected in the passenger compartment; an ultrasonic receiver, provided in the passenger compartment, for receiving ultrasonic signal reflected in the passenger compartment, a doppler shift signal outputting unit for outputting a doppler shift signal in response to the reflected and received ultrasonic signal from the ultrasonic receiver and the transmitted ultrasonic signal from the ultrasonic transmitter unit, a receiving signal level detecting unit for detecting the level of the received ultrasonic wave, a first determining unit for determining whether the doppler shift signal is within a predetermined amount corresponding to the movement of a person intruding into the passenger compartment, a second determining unit for determining whether the level of the received ultrasonic signal detected by the receiving signal level detecting unit is out of a range of a disturbance, and a detecting unit for detecting an illegal intrusion of a person only when the first determining unit determines that the doppler shift signal is within the predetermined amount corresponding to an intrusion and the second determining unit determines that the detected level of the received ultrasonic signal is out of the range of a disturbance.

By this construction, when there is no intrusion of a person, even when the doppler shift signal is within the predetermined amount because of disturbance, then if the detected level of the received ultrasonic signal is determined to be within the range of disturbance, an erroneous detection of an intrusion can be prevented.

According to a second aspect of the present invention, the predetermined amount is a predetermined range of frequency, and the first determining unit determines whether the frequency of the doppler shift signal is within the predetermined range of frequency.

By this construction, even when the frequency of the doppler shift signal is within the predetermined range of frequency, it is not detected as an illegal intrusion as long as the level of the received ultrasonic is within the range of a disturbance.

According to a third aspect of the present invention, the predetermined amount is a predetermined range of period, and the first determining unit determines whether the period of the doppler shift signal is within the predetermined range of period.

By this construction, even when the period of the doppler shift signal is within the predetermined range of period, it is not detected as an illegal intrusion as long as the level of the received ultrasonic is within the range of disturbance.

BRIEF DESCRIPTION OF THE DRAWINGS

The above object and features as well as other features of the present invention will be more apparent from the following description of the preferred embodiments when read with reference to the accompanying drawings, wherein.

DESCRIPTION OF THE PREFERRED EMBODIMENTS

In the following, embodiments of the present invention will be described with reference to the drawings.

Figure 1:
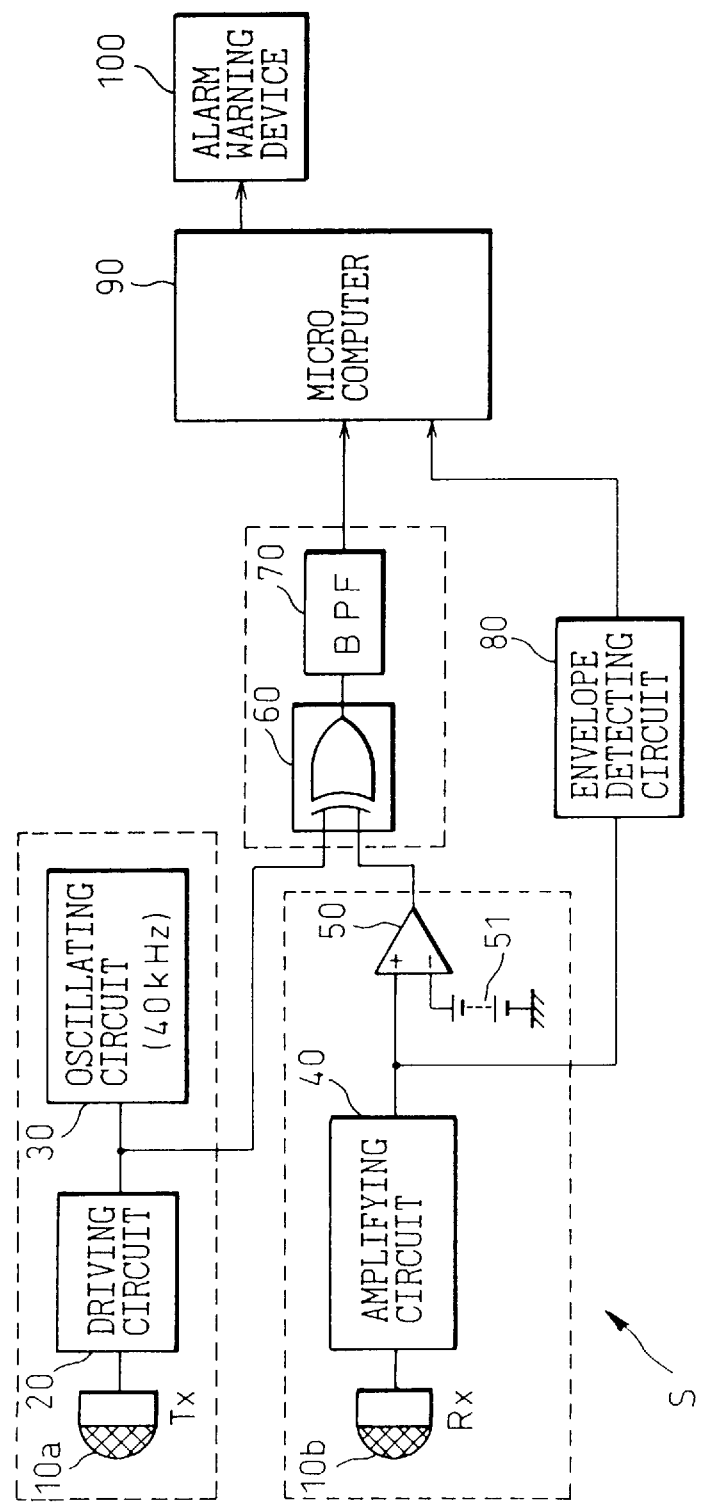
FIG. 1 is a block diagram of an intrusion detecting apparatus according to a first embodiment of the present invention.
Figure 2A:
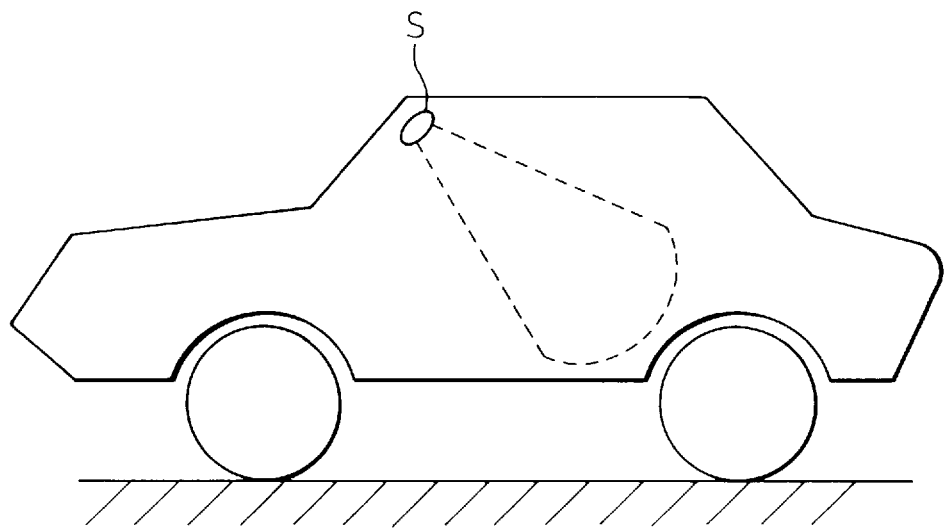
FIG. 2A is a diagram showing an example of an attached position of an ultrasonic transmitting and receiving sensor in a passenger compartment of the vehicle.
Figure 2B:
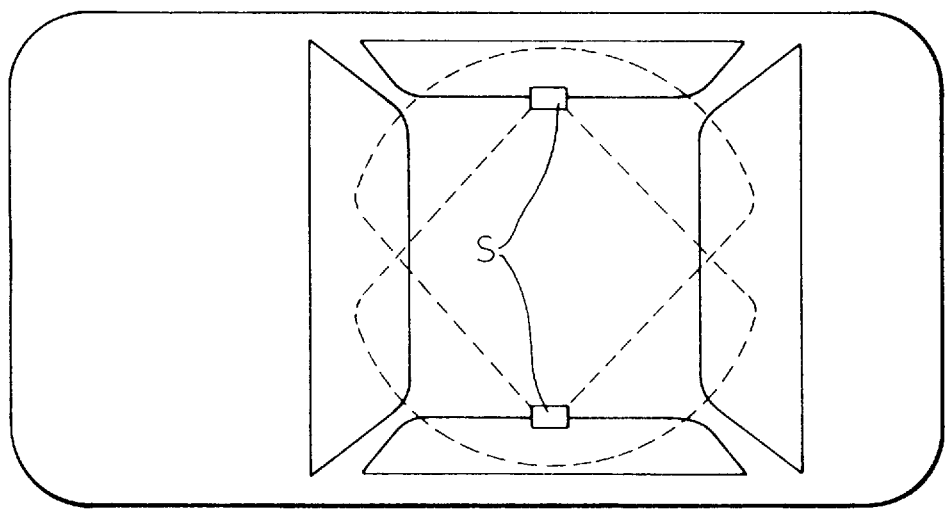
FIG. 2B is a diagram showing another example of an attached position of an ultrasonic transmitting and receiving sensor in a passenger compartment of the vehicle.

FIG. 1 is a block diagram showing an intrusion detecting apparatus according to an embodiment of the present invention. The intrusion detecting apparatus includes an ultrasonic transmitting/receiving sensor S. This ultrasonic transmitting/receiving sensor S is provided, for example, on a central portion of an upper edge of a front windshield in a passenger compartment of the vehicle, as shown in FIG. 2A. Alternatively, the sensor S may be provided on an upper portion of each seat belt pillar, as shown in FIG. 2B.

The ultrasonic transmitting/receiving sensor S includes an ultrasonic transmitter 10a and an ultrasonic receiver 10b, which are arranged closely to each other.

The ultrasonic transmitter 10a is connected through a driving circuit 20 to an oscillating circuit 30. The oscillating circuit 30 generates oscillating pulses with an oscillating frequency F (=40 KHz). The driving circuit 20 sequentially receives the oscillating pulses from the oscillating circuit 30 to drive the ultrasonic transmitter 10a. Thus, the ultrasonic transmitter 10a transmits an ultrasonic signal in response to the drive. The transmitted ultrasonic signal is reflected by objects in the passenger compartment of the vehicle. The ultrasonic transmitter 10a, the driving circuit 20 and the oscillating circuit 30 constitute an ultrasonic transmitting portion of the ultrasonic transmitting/receiving sensor S.

Figure 4:
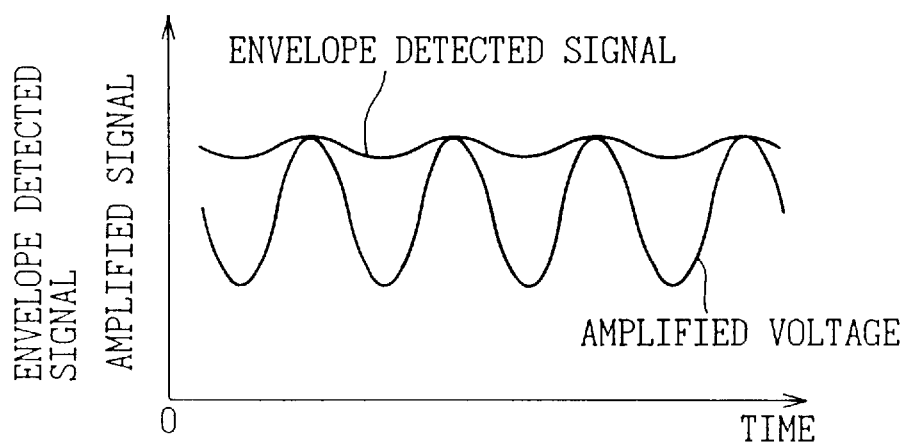
FIG. 4 is a timing chart showing an input/output wave form of the envelope detecting circuit shown in FIG. 1.

The ultrasonic receiver 10b receives the transmitted ultrasonic signal which has been reflected in the passenger compartment of the vehicle, and outputs it as a received signal to an amplifying circuit 40. The amplifying circuit 40 amplifies the received signal from the ultrasonic receiver 10b to output it as an amplified voltage having a sinusoidal waveform as shown in FIG. 4, to a comparing circuit 50.

The comparing circuit 50 compares the amplified voltage from the amplifying circuit 40 with a reference voltage Vr provided by a reference power supply 51. Only when the amplified voltage is higher than the reference voltage Vr, does the comparing circuit 50 output a compared signal of high level. The ultrasonic receiver 10b, the amplifying circuit 40, the comparing circuit 50 and the reference power supply 51 constitute a receiving portion of the ultrasonic transmitting/receiving sensor S.

A phase difference outputting circuit 60 consists of an exclusive OR gate (hereinafter referred to as an EXOR gate 60). The EXOR gate 60 generates a phase difference pulse signal by determining a phase difference between the phase of the oscillating pulse from the oscillating circuit 30 and the phase of the compared signal from the comparing circuit 50.

A bandpass filter 70 (hereinafter referred to as a BPF 70) filters out, from the phase difference pulse signal from the EXOR gate 60, frequency components corresponding to an intrusion speed of a person to generate a doppler shift signal. In this specification, the doppler shift signal is defined as a difference signal between the transmitted signal and the reflected and received signal. Here, the frequency difference specified by the doppler shift signal has a value based on the relative speed of a person with respect to the ultrasonic transmitting/receiving sensor S. The EXOR gate 60 and the BPF 70 constitutes a doppler detecting portion in the ultrasonic transmitting/receiving sensor S.

Figure 3:
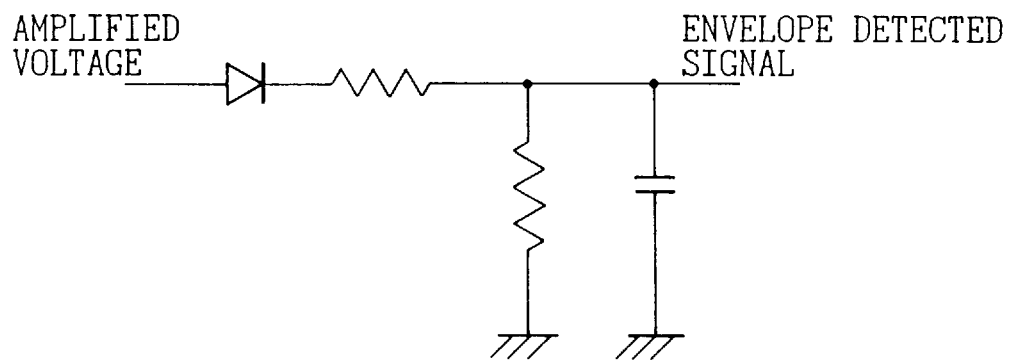
FIG. 3 is a circuit diagram of an envelope detecting circuit in the apparatus shown in FIG. 1.

An envelope detecting circuit 80 has a circuit construction as shown in FIG. 3, which functions as a receiving level detecting means. As shown in FIG. 4, the envelope detecting circuit 80 detects an envelope of an amplitude of an amplified voltage output from the amplifying circuit 40 to output an envelope detected signal.

Figure 5:
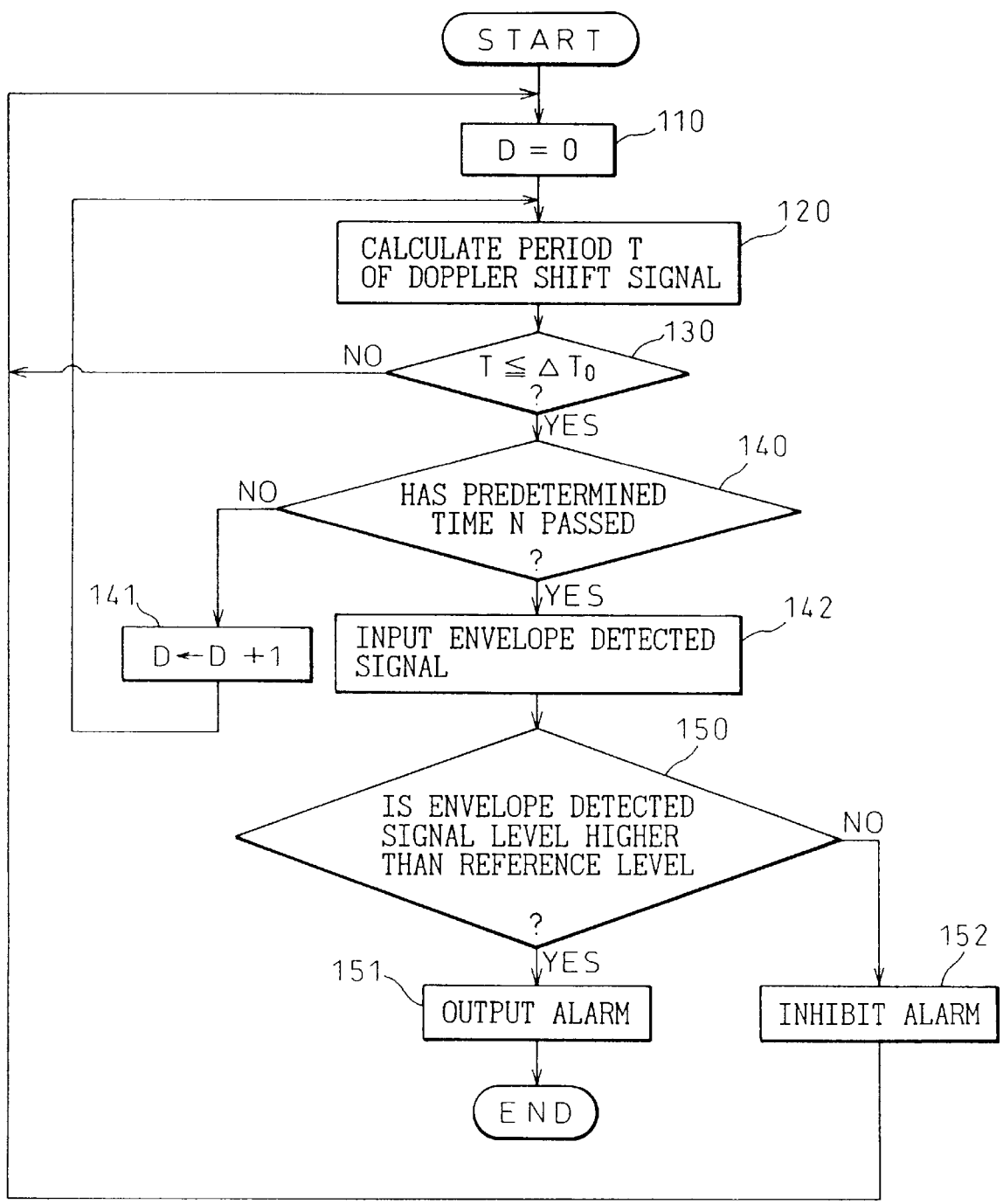
FIG. 5 is a flowchart showing a first example of the operation of a microcomputer in the apparatus shown in FIG. 1.

Based on the outputs from the BPF 70 and the envelope detecting circuit 80, a microcomputer 90 executes a computer program according to a flowchart shown in FIG. 5, and during this execution, it performs a calculation necessary to determine whether a person has illegally intruded. Note that the above-mentioned computer program is previously stored in a read only memory (ROM) in the microcomputer 90.

An alarm warning device 100 is controlled by the microcomputer 90 to sound an alarm on an illegal intrusion by a person.

In operation, when the ultrasonic transmitter 10a is driven by the driving circuit 20 based on the oscillating pulse from the oscillating circuit 30, an ultrasonic signal is transmitted into the passenger compartment of the vehicle and the transmitted ultrasonic signal is reflected by some material in the passenger compartment of the vehicle.

Then the reflected ultrasonic signal is received by the ultrasonic receiver 10b. The received signal is amplified by the amplifying circuit 40 to be output as an amplified voltage. The amplified voltage is then compared by the comparing circuit 50 with the reference voltage Vr from the reference power supply 51. When the amplified voltage is higher than the reference voltage Vr, the comparing circuit 50 outputs a high level compared signal.

Then the phase difference output circuit 60 generates a phase difference output signal in accordance with the difference between the phase of the oscillating pulse from the oscillating circuit 30 and the phase of the compared signal from the comparing circuit 50, and the BPF 70 outputs a doppler shift signal based on the phase difference output signal. The envelope detecting circuit 80 detects the envelope of the amplified voltage from the amplifying circuit 40 to output an envelope detected signal.

In this situation, when the microcomputer 90 is in operation, the computer program is executed in accordance with the flowchart shown in FIG. 5.

In the operation of the microcomputer 90, at step 110, a time count data D is cleared to zero. At step 120, a period T of the doppler shift signal from the BPF 70 is calculated. Then at step 130, it is determined as to whether or not the period T is within a predetermined period $\Delta T_0$. Here the predetermined period $\Delta T_0$ corresponds to a relative intruding speed of a person into the passenger compartment of the vehicle with respect to the ultrasonic transmitting/receiving sensor S.

When the period T is within the predetermined period $\Delta T_0$, the process proceeds to step 140 where it is judged as to whether or not this state, i.e., the state in which the period T is within the predetermined period $\Delta T_0$, continues for a predetermined time N. If the state does not continue for the predetermined time N, the process proceeds to step 141 where the time count data D is incremented.

The above-mentioned predetermined time N is a time considered to be necessary for a person to intrude into the passenger compartment of the vehicle. The predetermined time N is preferably about 300 milliseconds.

When the predetermined time N has passed at step 140, it is tentatively judged that a person has illegally intruded, and the process proceeds to step 142 where the envelope detected signal from the envelope detecting circuit 80 is input into the microcomputer 90.

Then at step 150, it is determined as to whether or not the envelope detected signal is higher than a reference level.

According to this embodiment of the invention, the reference level is determined as follows.

That is, the inventors of the present invention analyzed an influence of disturbance, i.e., air turbulence on the input ultrasonic signal to the ultrasonic receiver 10b or on the connecting line from the ultrasonic receiver 10b to the comparing circuit 50. As a result of the analysis, it has been found that, when there is air turbulence, the output level of the amplifying circuit 40, that is the input level of the comparing circuit 50, is raised so that the comparing circuit 50 outputs the high level compared signal even when the air turbulence is not caused by an intrusion.

If the processes in the phase difference output circuit 60, in the BPF 70 and in the microcomputer 90 are performed based on the compared signal, the doppler shift signal may be generated even when a person does not intrude.

Therefore, according to this embodiment of the present invention, the above-mentioned reference level is set to be the upper limit value of the input level of the comparing circuit 50 generated by air turbulence.

When the level of the envelope detected signal is higher than the reference level, the result of the judgement at step 150 is "YES".

This means that the judgement of "YES" at the step 140 is ensured by the judgement of "YES" at step 150. In other words, the doppler shift signal output from the BPF 70 has been detected as a signal certainly caused by an illegal intrusion of a person into the passenger compartment of the vehicle. Thus, the process proceeds to step 151 to effect an alarm processing so that the alarm warning device 100 outputs an alarm signal.

On the other hand, when the result of the judgement at step 150 is "NO", this means that the judgement of "YES" at step 140 is corrected to be "NO" at step 150. In other word, the doppler shift signal output from the BPF 70 has been judged as a signal which is not caused by an illegal intrusion of a person into the passenger compartment of the vehicle but is a signal caused by air turbulence. Thus, at step 152, an alarm inhibiting process is carried out. Thus, an erroneous alarm by the alarm warning device 100 indicating an intrusion even when no person has intruded can be prevented.

In the above-described embodiment, the judgement at step 140 is always effected when the judgement at step 130 is "YES". The present invention, however, is not limited to this, but, alternatively, the determination at the step 140 may be effected at least at the beginning and at the end of the above-mentioned predetermined period N, resulting the same effects as in the above-described first example. To realize this, in place of counting the value D, a timer may be provided to count time after the step 110, and it is judged whether or not the predetermined period has passed at step 140. If the predetermined time has not passed, the process returns back to step 120. Thus, the step 141 is eliminated.

In the above-described embodiment, at step 120, the period T of the doppler shift signal is calculated, and at step 130, it is determined whether or not the period T is within the predetermined period $\Delta T_0$. However, it may also be possible to determine whether or not a frequency of the doppler shift signal is within a predetermined frequency range (corresponding to the above-mentioned period range $\Delta T_0$) so as to achieve the same effects as those in the above-mentioned embodiment.

Figure 6:
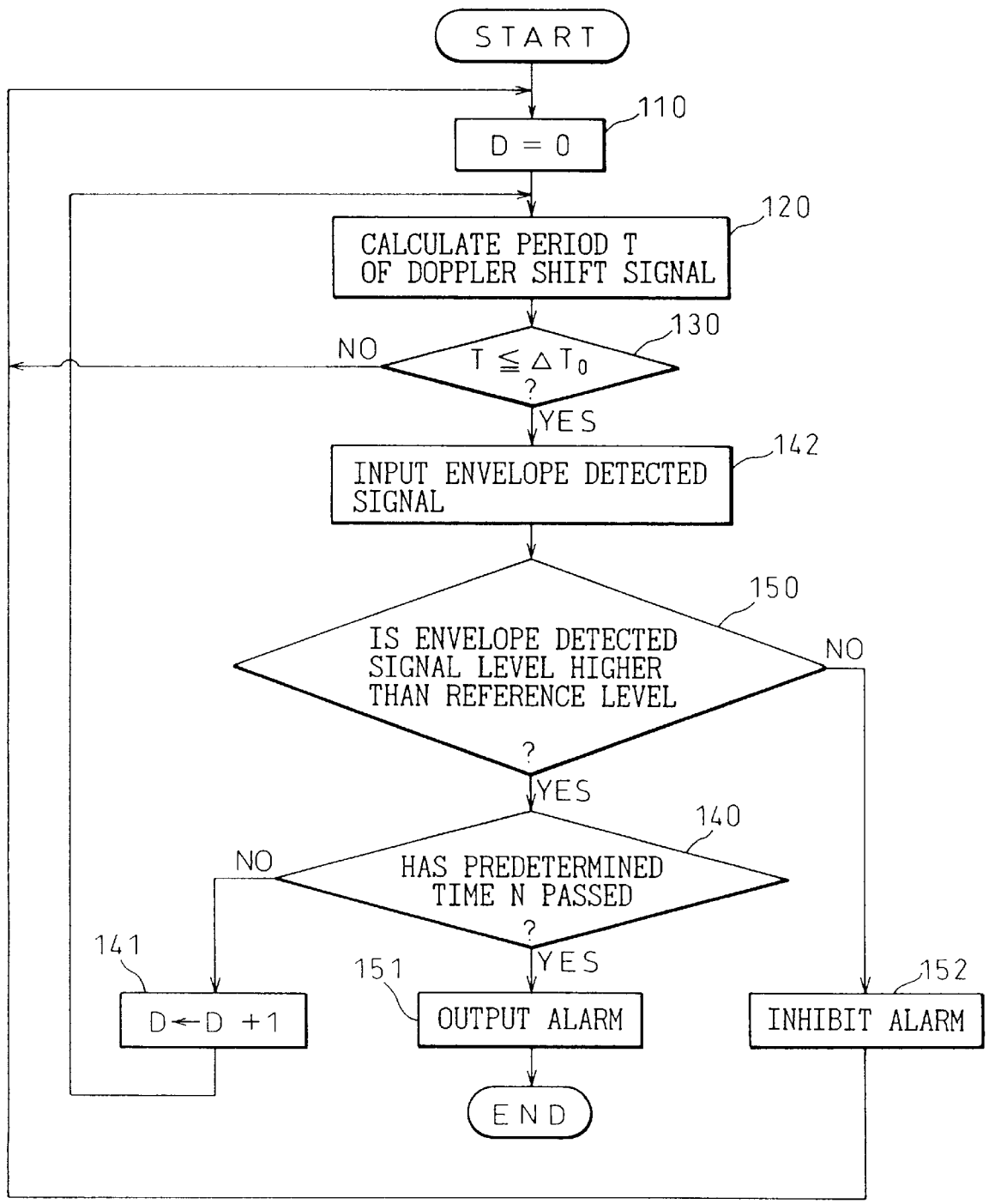
FIG. 6 is a flowchart showing a second example of the operation of the microcomputer in the apparatus shown in FIG. 1.

As an alternative to the flowchart of FIG. 5, a modification of the flowchart as shown in FIG. 6 may be employed according to a second example of the first embodiment of the present invention.

The difference between FIG. 5 and FIG. 6 is that, in FIG. 6, the step 140 is carried out immediately after the judgement at step 150 is "YES". In FIG. 6, the same reference numerals represent the same processes as in FIG. 5. Referring to FIG. 6, after the processes in steps 142 and 150 as in the above-mentioned first example, when the determination at step 150 is "NO", the alarm inhibiting process at step 152 as mentioned in the above-described first example is carried out, but when the determination at step 150 is "YES", the determination process at step 140 as mentioned in the above-described first example is carried out.

When the determination at step 140 is "NO", the addition to update D, i.e., D=D+1, is carried out at step 141. When the determination at step 140 is "YES", the alarm process at step 151 as mentioned in the above-described first example is carried out.

Thus, even when the steps 142 and 150 are carried out before carrying out the step 140, the same effects can be achieved as in the above-described first example.

Figure 7:
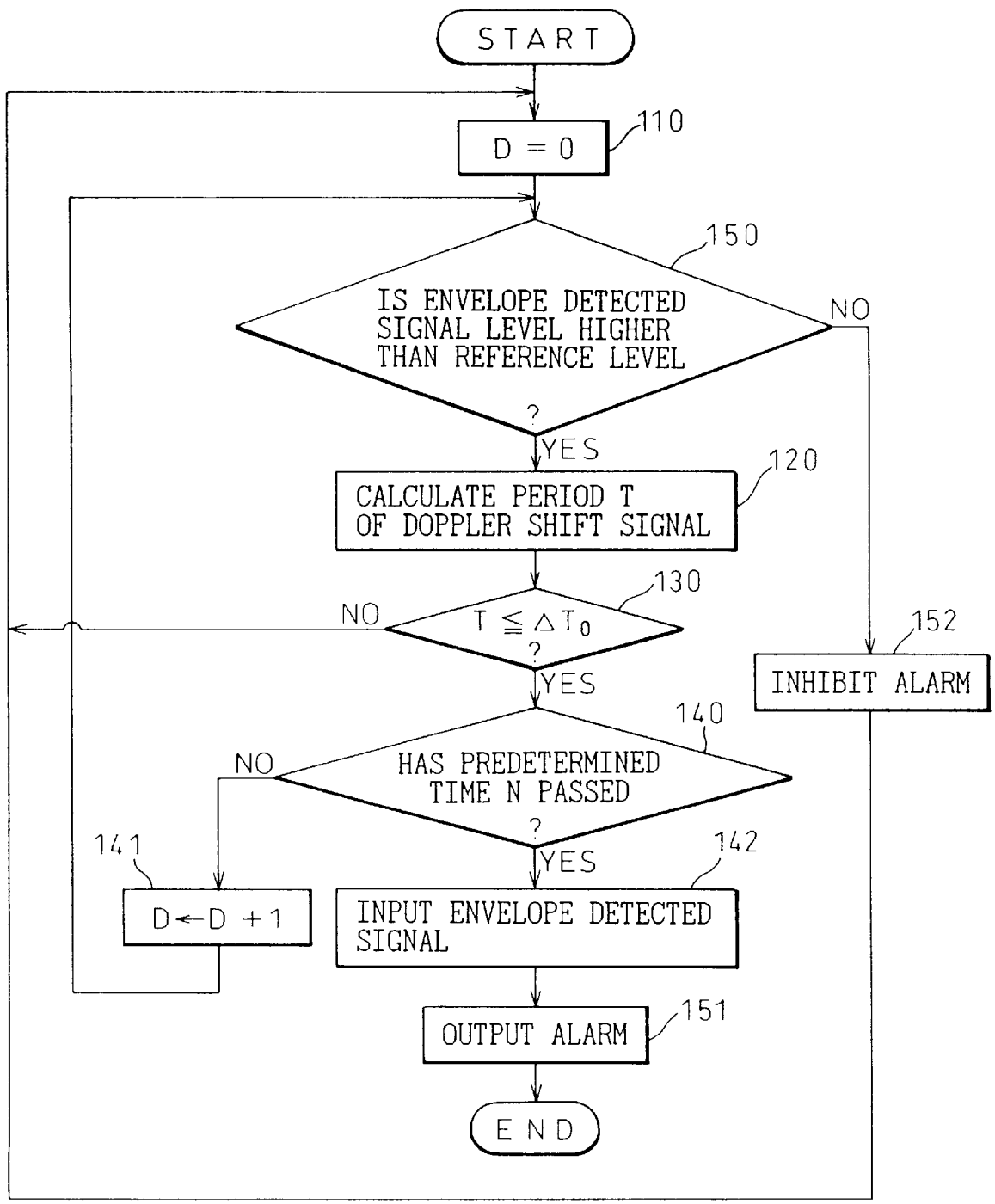
FIG. 7 is a flowchart showing a third example of the operation of the microcomputer in the apparatus shown in FIG. 1.

As an alternative to the flowchart of FIG. 5, a further modification of the flowchart as shown in FIG. 7 may also be employed according to a third example of the first embodiment of the present invention. The difference between FIG. 5 and FIG. 7 is that, in FIG. 7, the step 150 for determining whether or not the envelope detected signal level is higher than the reference level is carried out immediately after the initialization at step 110. When the determination at step 150 in FIG. 7 is "YES", then the determination processes of the steps 130 and 140 are carried out.

Thus, even when the step 150 is carried out before carrying out the steps 130 and 140, the same effects can be achieved as in the above-described embodiment.

A countermeasure to air turbulence is disclosed in, for example, Japanese Patent Publication (Kokai) No. 52-24100 in which an intrusion alarm apparatus is proposed in which the doppler signal is filtered through a bandpass filter to take out frequency components corresponding to air turbulence, and the frequency components are subjected to logarithmic conversion and detection, and then, based on the detection result, an intrusion is correctly detected while any error detection due to air turbulence is avoided.

By this intrusion alarm apparatus, however, even though an intrusion is correctly detected, it is necessary to observe the amplitude fluctuation of the above-mentioned frequency components for the long time of several seconds.

Further, since the amplitude fluctuation of the above-mentioned frequency components taken out from the doppler signal is so small that it is difficult to discriminate, by the amplitude fluctuation only, whether the fluctuation is caused by air turbulence or an intrusion. Therefore, there is a disadvantage in that the additional circuit for the logarithmic conversion must be employed.

In view of the above disadvantage, the inventors of the present invention made experiments to inspect the difference of the envelope level of the amplitude of the received ultrasonic signal between a case of air turbulence, i.e., disturbance, and a case of an intrusion. As a result of the experiments, the characteristics shown in FIG. 8 for the case of air turbulence and FIG. 9 for the case of an intrusion were obtained.

Figure 8:
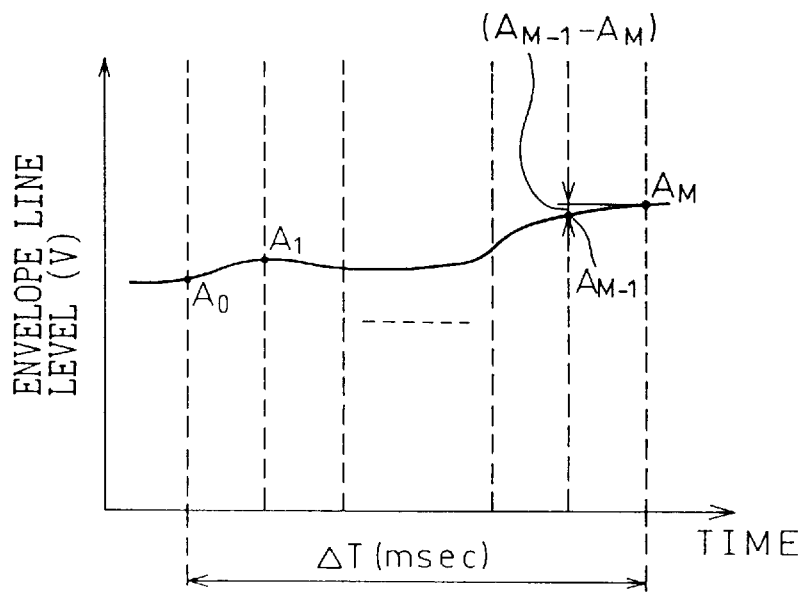
FIG. 8 is a graph showing a change of an envelope level with respect to time when there is air turbulence in the passenger compartment of the vehicle.
Figure 9:
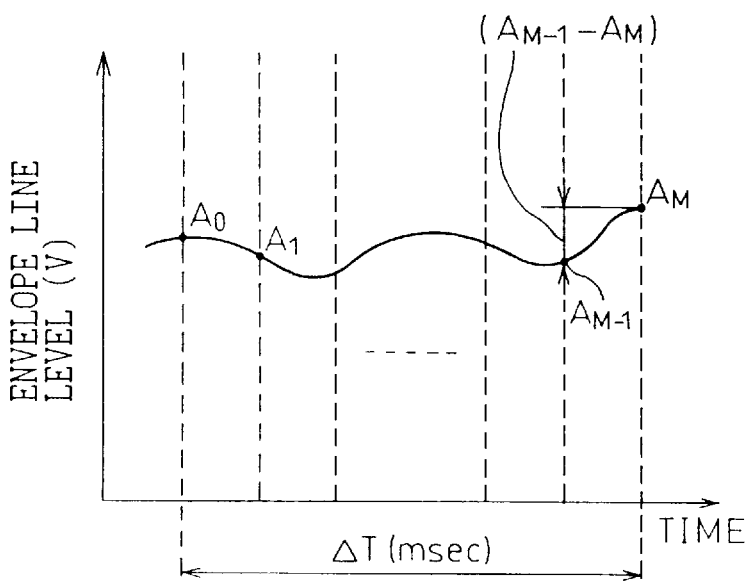
FIG. 9 is a graph showing a change of an envelope level with respect to time when a person intrudes into the passenger compartment of the vehicle.

From FIG. 8 and FIG. 9, it is appreciated that a differential value of the envelope level in FIG. 8 with respect to time, that is, the degree of change in time, for the case of air turbulence is apparently smaller than the differential value of the envelope level in FIG. 9 with respect to time, that is, the degree of change in time for the case of an intrusion.

Accordingly, when summing the absolute values of the respective differential values within a predetermined period, it is presumed that the sum of the absolute values for the case of an intrusion will be clearly greater than the sum of the absolute values for the case of air turbulence.

In view of the above presumption, according to a fourth example of the first embodiment of the present invention, there is provided an intrusion detecting apparatus for a vehicle which can surely prevent an error detection due to air turbulence.

Figure 10:
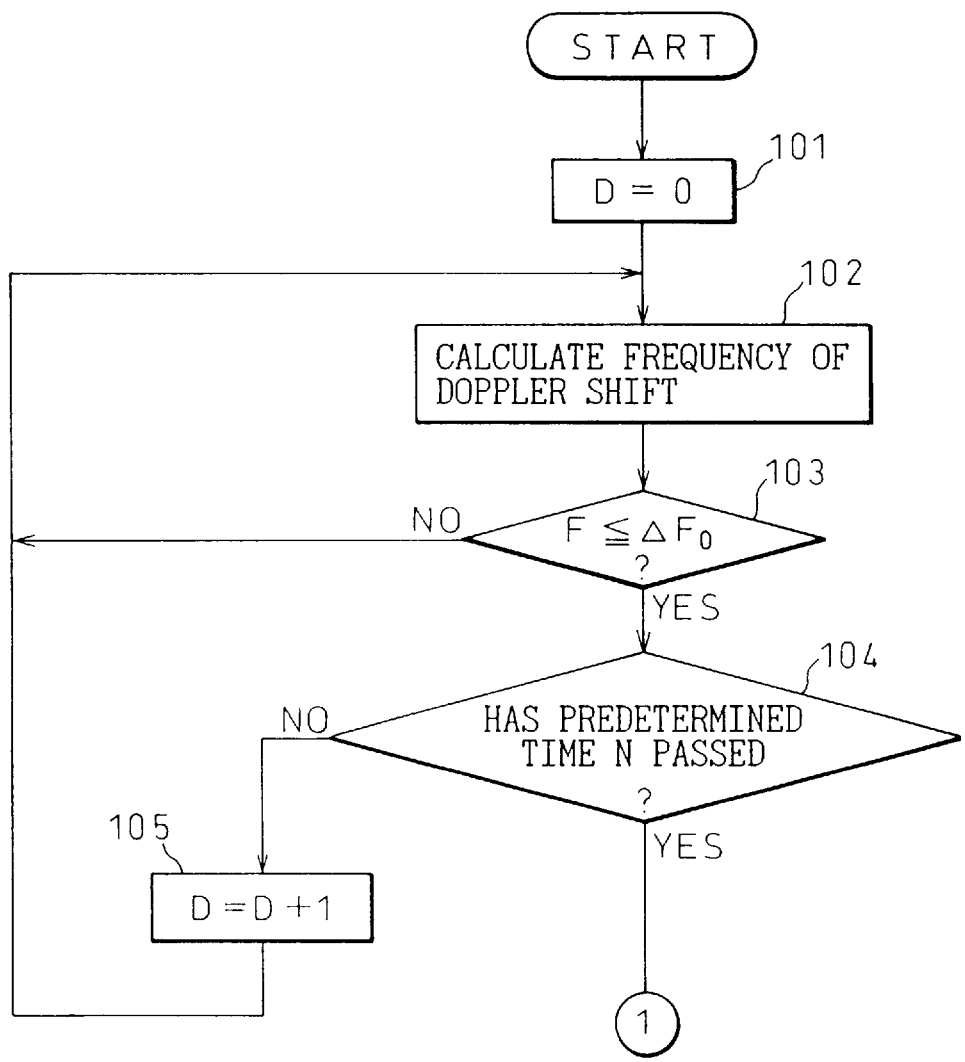
FIG. 10 is a first half of a flowchart showing a fourth example of the operation of the microcomputer in the apparatus shown in FIG. 1.
Figure 11:
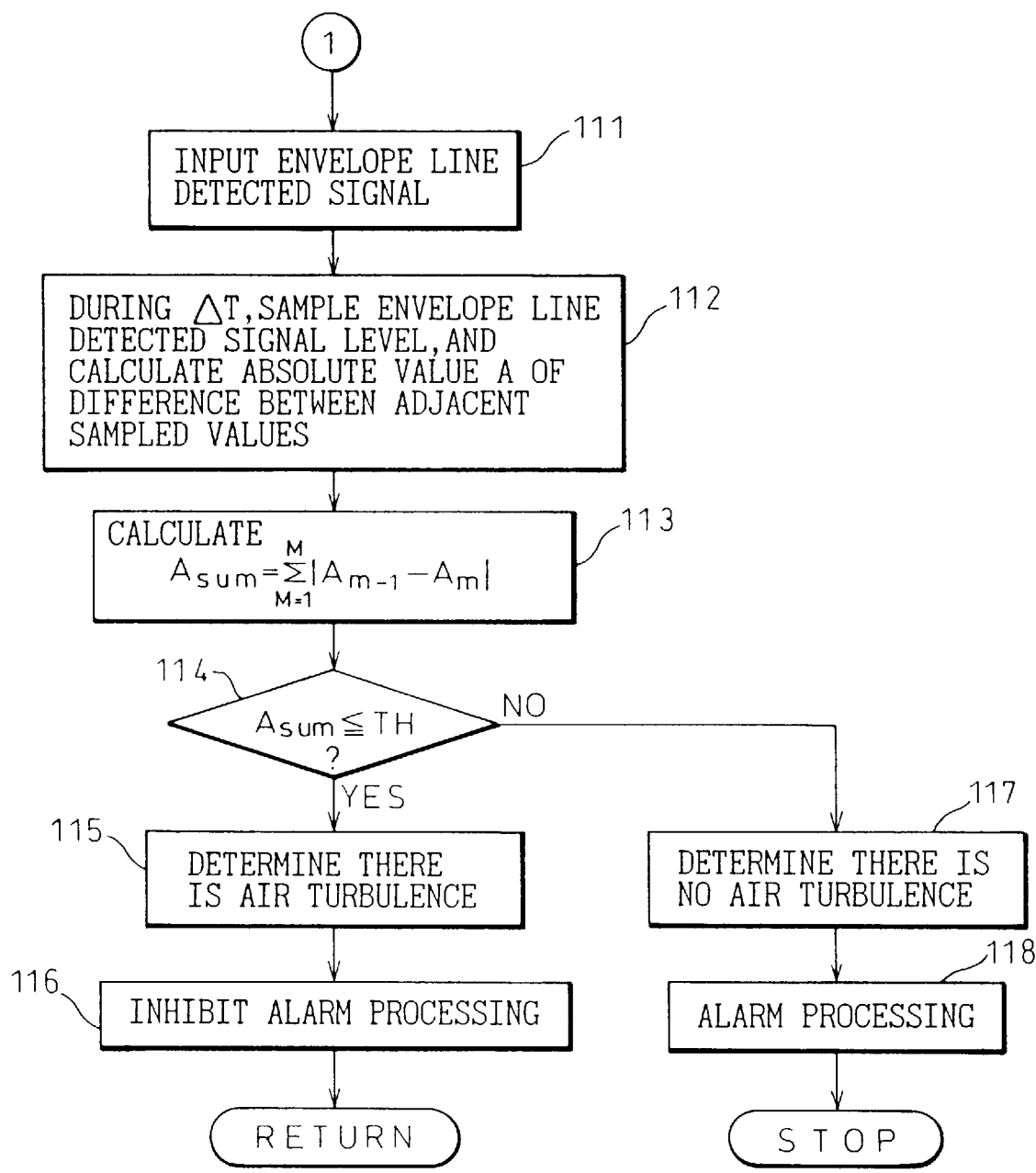
FIG. 11 is a second half of the flowchart of FIG. 10.

FIG. 10 and FIG. 11 are flowcharts explaining the operation of the microcomputer 90 according to the fourth example of the first embodiment of the present invention.

In FIG. 10, at step 101, a time count data D is initialized to zero. At step 102, the frequency F of the doppler shift signal output from the BPF 70 is calculated. Then at step 103, it is judged as to whether or not the frequency F is within a predetermined frequency range $\Delta F_0$.

Here the predetermined frequency range $\Delta F_0$ is a frequency range corresponding to the relative speed of a person who is intruding into the passenger compartment of the vehicle.

When the frequency range F is within the predetermined frequency range $\Delta F_0$, the process proceeds to step 104 where it is determined as to whether or not the time count D reaches a predetermined time N. When the time count D has not yet reached the predetermined time N, then the process proceeds to step 105 where the count data D is incremented.

The above-mentioned predetermined time N is a time considered to be necessary for a person to intrude into the passenger compartment of the vehicle.

When the time count D reaches the predetermined time N at step 104, it is tentatively judged that a person has illegally intruded, and the process proceeds to step 111 in FIG. 11 where the envelope detected signal from the envelope detecting circuit 80 is input into the microcomputer 90.

Then at step 112, during a predetermined time $\Delta T$ from the current time point (for example during 30 milliseconds through 100 milliseconds), the level of the envelope detected signal is repeatedly sampled at a predetermined sampling timing so that sampled values $A_0, A_1, \ldots A_M$ are sequentially obtained. Here the suffix M for the value AM represents a value obtained by dividing the predetermined time width $\Delta T$ by a sampling timing interval P.

Then, at step 112, an absolute value $|A_{m-1}-A_m|$ of each difference between adjacent sampled values of the continuous sampled values is calculated. Note that the absolute value $|A_{m-1}-A_m|$ corresponds to the differential value of the envelope detected signal from the envelope detecting circuit 80 (see FIG. 8 and FIG. 9).

After the process at step 112 is finished, the process proceeds to the next step 113 where the sum $A_{sum}$ of the absolute values is calculated in accordance with the following equation:

$$A_{sum} = \sum_{m=1}^{M} |A_{m-1} - A_m|$$

Then at step 114, it is determined as to whether or not the sum $A_{sum}$ of the absolute values is lower than a predetermined threshold value TH.

Figure 12:
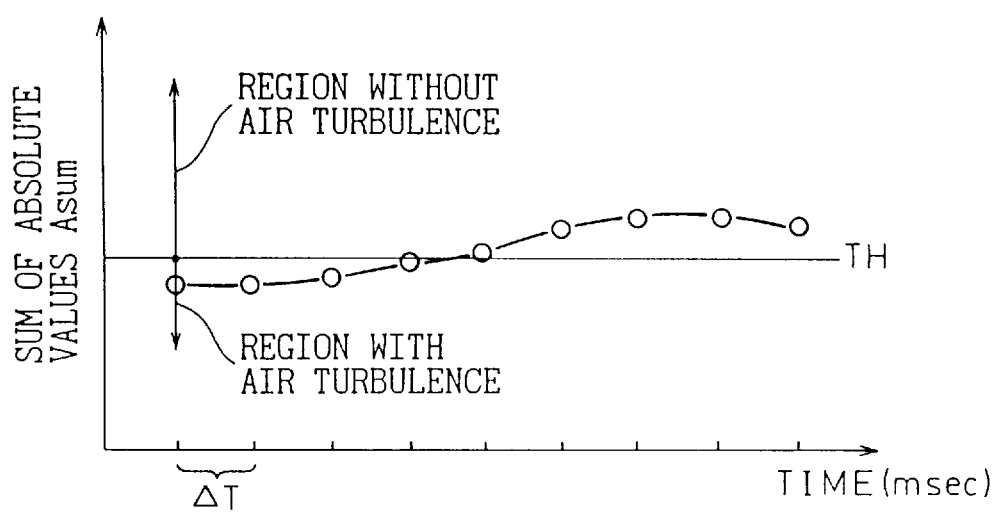
FIG. 12 is a timing chart showing the relation between the sum of absolute values and a threshold value TH.

In this embodiment, the predetermined threshold value TH is a reference to judge whether or not there is air turbulence (see FIG. 12).

When the sum $A_{sum}$ of the absolute values is below the predetermined threshold value TH, the process proceeds to step 115 where it is determined that there is air turbulence. This means that the judgement of "YES" at step 104 is due to the air turbulence and that the judgement of an intrusion was an error.

Then at step 116, a process to inhibit an alarm is carried out. Therefore, even when it has been tentatively judged by means of the doppler shift that a person has intruded, the error alarm by the alarm warning device 100 is inhibited when the doppler shift is caused by air turbulence.

On the other hand, when the judgement at step 114 is "NO", the process proceeds to step 117 where it is judged that there is no air turbulence. This means that the judgement of "YES" at step 104 is not due to the air turbulence and that the judgement of an intrusion is correct.

Then at step 118, an alarm processing is carried out to raise an alarm by the alarm warning device 100.

As described above, according to this fourth example of the first embodiment, the absolute values $|A_{m-1}-A_m|$ of the difference between adjacent sampled values of the level of the envelop detected signal from the envelope detecting circuit 80 are utilized. There is a clear difference in the sum of the absolute values between the case where there is air turbulence and the case where an intrusion occurs. By comparing the sum of the absolute values with the predetermined threshold value TH, the judgement of whether or not there is air turbulence can be correctly carried out.

As a result, it is possible to provide an intrusion detecting apparatus for a vehicle which can correctly detect an intrusion of a person into a passenger compartment of the vehicle by utilizing doppler shift of the ultrasonic signal, without being influenced by air turbulence and without employing excessive circuit elements.

The above-mentioned sum of the absolute values is calculated based on the differential values of the level of the envelope detected signal from the envelope detecting circuit 80. Accordingly, even when the calculating time for the sum of the absolute values is short, for example, from 30 milliseconds to 100 milliseconds, there is a clear difference in the sum of the absolute values between the case where there is air turbulence and the case where an intrusion occurs. This means that the detection of an intrusion can be effected within a short time.

Note that the above-mentioned calculating time for calculating the sum of the absolute values is not restricted to within 30 milliseconds to 100 milliseconds, but may be within, for example, 1 second, to achieve the same effects as mentioned above.

Also, in the above-described fourth example, the frequency of the doppler shift signal is first calculated, and then it is judged whether or not the frequency is within the predetermined frequency range. However, it may also be possible to calculate first the period of the doppler shift signal and then to judge as to whether or not the period is within a predetermined period (corresponding to the predetermined frequency range) so as to achieve the same effects as in the abovedescribed fourth example.

From still another point of view, in the intrusion detecting apparatus utilizing the ultrasonic doppler signal, the detection of an illegal intrusion is usually carried out when the vehicle is stopped. Therefore, naturally, the intrusion detecting apparatus must be operated by supplying the power during the stopped state of the vehicle. In addition, the intrusion detecting apparatus usually transmits and receives the ultrasonic signal continuously in order to detect an illegal intrusion of a person by detecting his movement. As a result, there is a disadvantage in that the power consumption of the intrusion detecting apparatus is large.

In view of the above disadvantage, the inventors of the present invention paid an attention to the fact that there is a continuous movement of a person when he intrudes into a vehicle, and analyzed the various conditions of the person's intrusion. As a result, the inventors of the present invention recognized that, even when the intrusion detecting apparatus of a doppler ultrasonic type is intermittently operated, if the intermittent period is made to be sufficiently shorter than the period in which the person moves continuously, and if the intermittent period is made to be as long as possible within the above condition, the intrusion detecting apparatus can provide a proper doppler shift amount corresponding to the intrusion and moving state of a person so as to be able to detect the illegal intrusion, whereby the power consumption can be sufficiently reduced.

Thus, according to the a second embodiment of the present invention, there is provided an intrusion detecting apparatus for a vehicle which operates intermittently to detect the doppler shift caused by a movement, while the power consumption is reduced.

Figure 13:
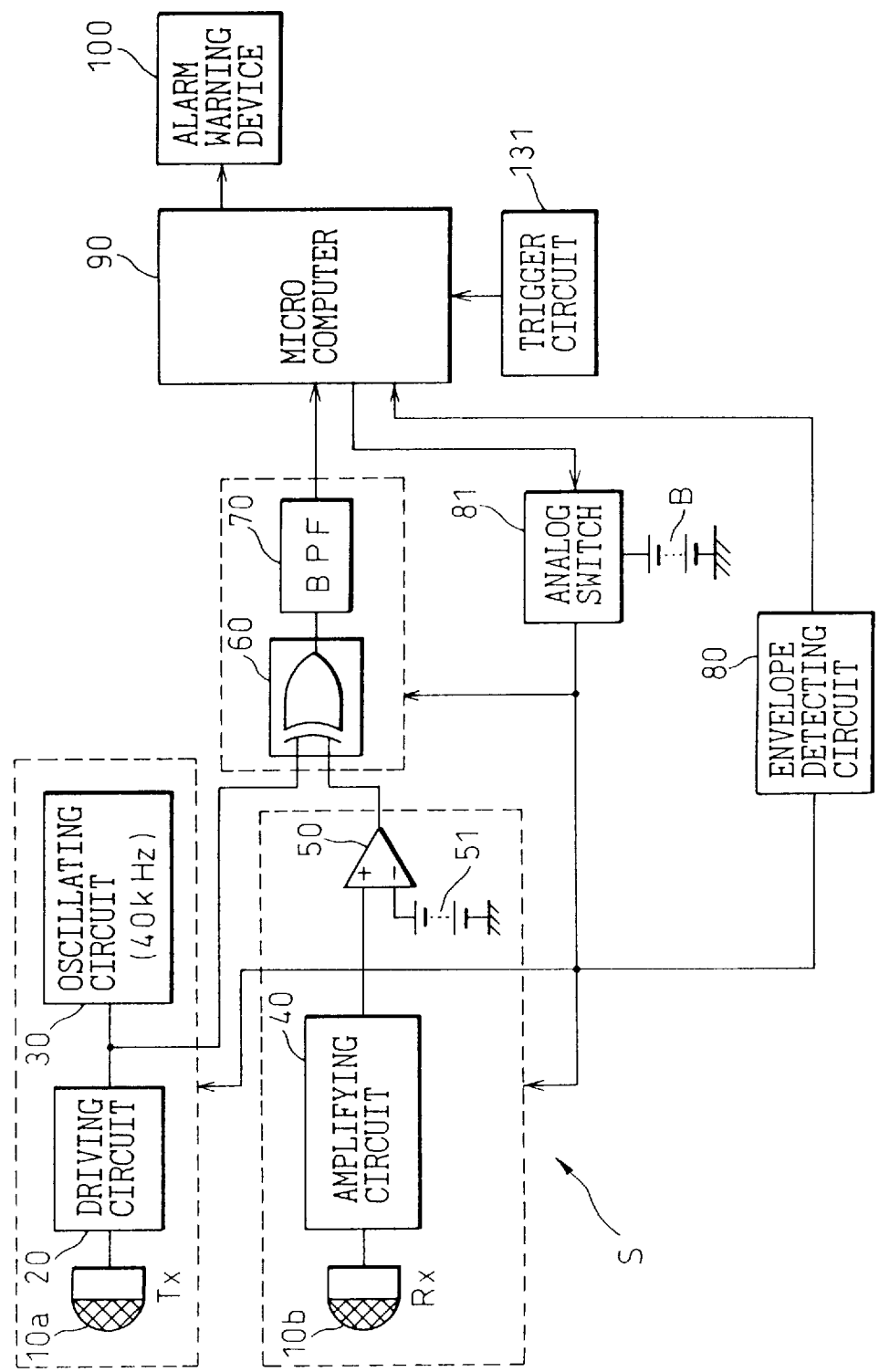
FIG. 13 is a block diagram of an intrusion detecting apparatus according to a second embodiment of the present invention.

FIG. 13 is a block diagram of an intrusion detecting apparatus according to the second embodiment of the present invention. The difference between the apparatus shown in FIG. 1 and the apparatus shown in FIG. 13 is that, in FIG. 13, an analog switch 81 and a trigger circuit 131 are additionally provided. The other elements are the same as those in FIG. 1 and are denoted by the same reference numerals. At least one of the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 are supplied with power from a battery B through the analog switch 81 to be turned to their operating states.

That is, the analog switch 81 is turned ON under the control of the microcomputer 90 to supply power from the battery B to at least one of the ultrasonic transmitter 10a, the driving circuit 20, the oscillating circuit 30, the ultrasonic receiver 10b, the amplifying circuit 40, the comparing circuit 50, the phase difference output circuit 60 and the BPF 70, and is turned OFF to cut the power supply.

The trigger circuit 131 generates trigger pulses with a predetermined period P of, for example, 160 milliseconds, to output to the microcomputer 90.

Figure 14:
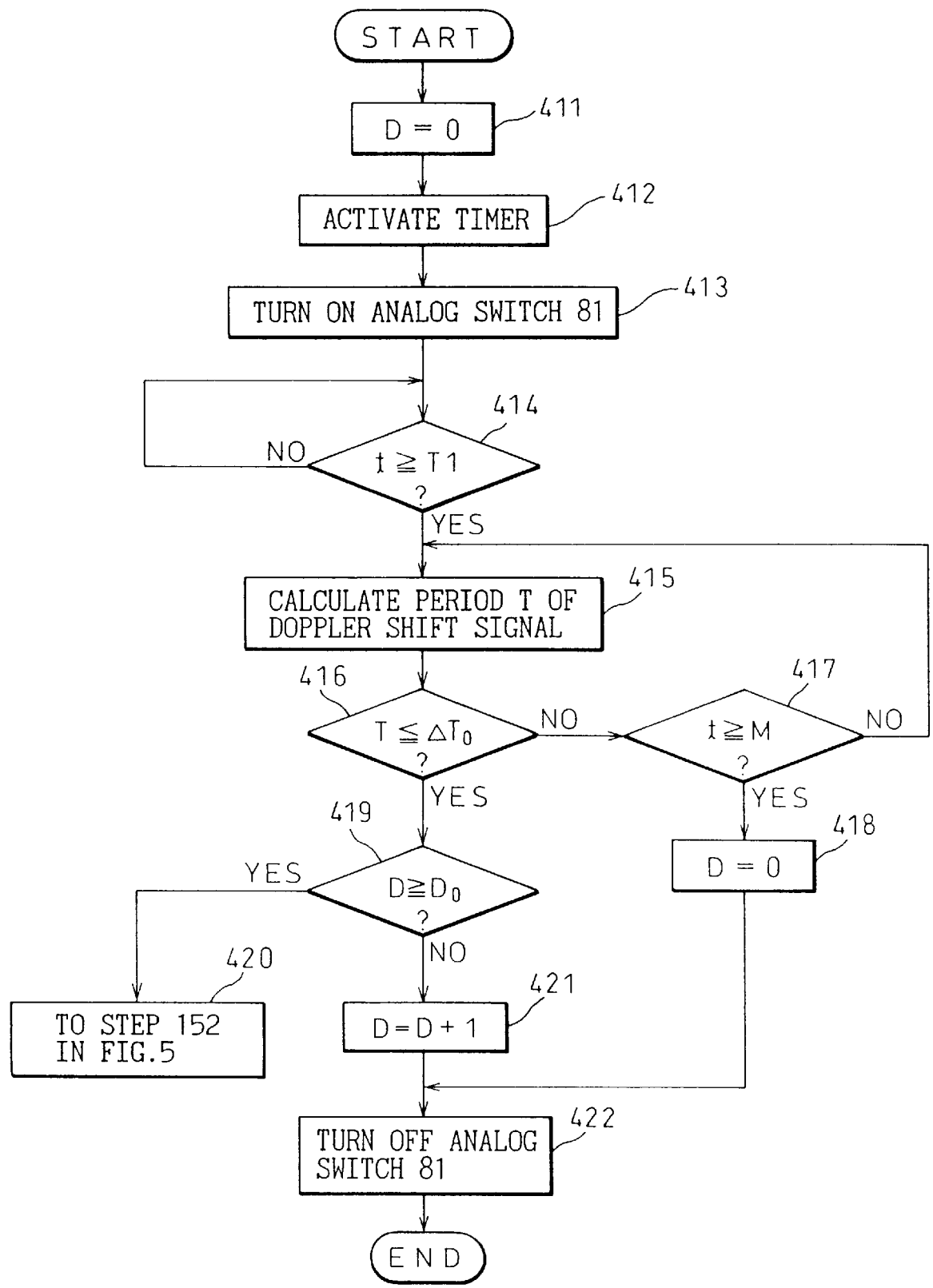
FIG. 14 is a flowchart showing a first example of the operation of a microcomputer in the apparatus shown in FIG. 13.

In place of the steps 110 to 141 in FIG. 5, the microcomputer 90 executes a computer program in accordance with the flowchart shown in FIG. 14, and based on the output of the BPF 70. By this execution, the analog switch 81 is controlled, and the calculating process necessary to judge whether or not there is an intrusion is performed. The execution of the computer program by the microcomputer 90 is started each time when the trigger circuit 131 outputs a trigger pulse. Note that the above-mentioned computer program is previously stored in the ROM in the microcomputer 90.

The alarm warning device 100 is controlled by the microcomputer 90 to output an alarm indicating an illegal intrusion.

Referring to FIG. 14, the operation of the microcomputer 90 in accordance with this second embodiment will be described.

First, at step 411, an initialization process is executed so that a count value D is initialized to zero.

Then at the next step 412, a built-in timer in the microcomputer 100 is reset and activated. Thus the timer starts to count the time.

Then at step 413, an ON process command is output to the analog switch 81 so that the analog switch 81 is turned ON. Thus, a power is supplied from the battery B to the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 to put them in their operating states.

While the count value t of the timer is within a waiting time T1, the judgement at step 414 is "NO". In this state, the ultrasonic transmitter 10a is driven by the driving circuit 20 based on the oscillating pulses from the oscillating circuit 30 to transmit an ultrasonic signal into the passenger compartment of the vehicle. The transmitted ultrasonic signal is reflected by material bodies or walls in the passenger compartment of the vehicle. The reflected ultrasonic wave is received by the ultrasonic receiver 10b. The received signal is amplified by the amplifying circuit 40 to be output as an amplified voltage.

Then the amplified voltage is compared by the comparing circuit 50 with the reference voltage $V_r$ from the reference power supply 51. When the amplified voltage is higher than the reference voltage $V_r$, the comparing circuit 50 outputs a high level compared signal. After this, the phase difference output circuit 60 generates a phase difference output signal in accordance with the difference between the phase of the oscillating pulse from the oscillating circuit 30 and the phase of the compared signal from the comparing circuit 50. Then the BPF 70 outputs a doppler shift signal based on the phase difference output signal.

Figure 15:
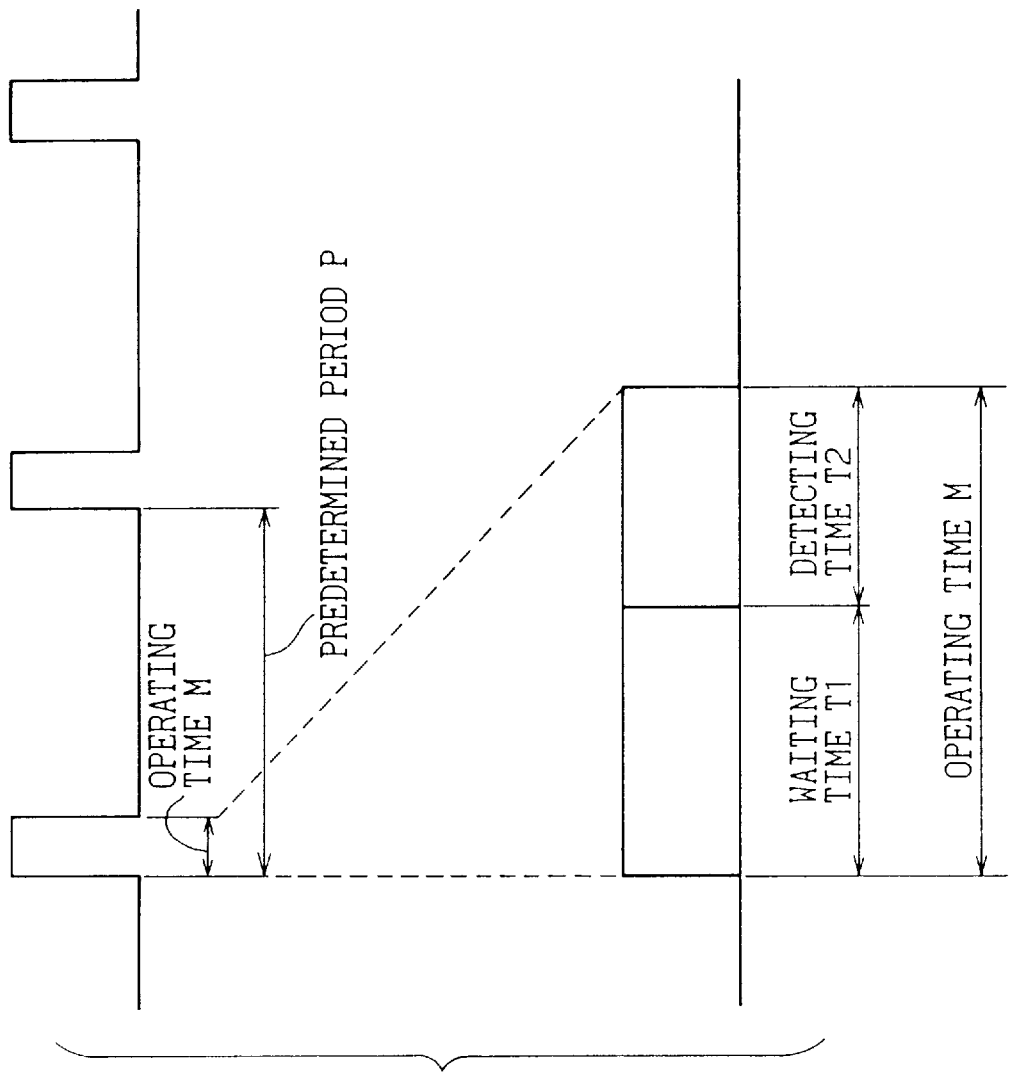
FIG. 15 is a timing chart showing an intermittent operation of the apparatus shown in FIG. 13.

The above-mentioned waiting time T1 is introduced to specify a detecting time T2 and an operating time M as shown in FIG. 15. The operating time M represents the time to allow the operation of the ultrasonic transmitter 10a, the driving circuit 20, the oscillating circuit 30, the ultrasonic receiver 10b, the amplifying circuit 40, the comparing circuit 50, the phase difference output circuit 60 and the BPF 70.

This operating time M is, as shown in the lower part of FIG. 15 in an expanded view, the sum of the waiting time T1 and the detecting time T2. The operating time M1 is set in such a way that the power consumption of the battery B can be reduced as long as possible. The waiting time T1 represents a time in which the ultrasonic transmitter 10a transmits an ultrasonic signal, the transmitted ultrasonic signal is reflected in the passenger compartment of the vehicle, the reflected ultrasonic signal is received by the ultrasonic receiver 10b, and the microcomputer 90 receives the output of the BPF 70.

The detecting time T2 corresponds to a time which is sufficient to properly detect a movement of a person intruding into the passenger compartment of the vehicle. The movement speed of a person intruding into the passenger compartment of the vehicle is considered to be about from 0.2 m/sec to 2 m/sec. Therefore, the frequency of the doppler shift signal due to the movement of a person is from about 44 Hz to 450 Hz. Accordingly, to correctly detect the movement of a person, the minimum detecting time T2 must be a time corresponding to about 44 Hz, that is about 25 milliseconds.

In view of the above analysis, according to this second embodiment, the operating time M is set to be, for example 55 milliseconds. The shorter the operating time M, the lower the power consumption of the battery B. Note that the operating time M is previously stored in the ROM in the microcomputer 90.

Under the above condition, when the count value t of the timer reaches the waiting time T1, the process proceeds to step 415. The steps 415 and 416 in FIG. 14 are similar to the steps 120 and 130 in FIG. 5.

At step 416, when a period T of the doppler shift signal is not within a predetermined period $\Delta T_0$, it is judged that there is no intrusion into the passenger compartment of the vehicle, and the process proceeds to step 131. As long as the count value t of the timer is smaller than the operating time M, the steps 415 to 417 are repeated.

During this repetition, when the judgement at step 416 becomes "YES", it is tentatively determined that a person has intruded into the passenger compartment of the vehicle, and the process proceeds to step 419 where it is judged as to whether or not the count number D has reached a predetermined number $D_0$. This predetermined number $D_0$ is a number of continuous judgements by which it is correctly judged that a person has certainly intruded. The predetermined number $D_0$ is determined by taking error judgements of "YES" due to disturbance at step 416 into account.

At step 419, when the count number D is smaller than the predetermined number $D_0$, the process proceeds to step 421 where the count number D is incremented.

On the other hand, after the judgement of "NO" at step 416, when the count value t reaches to the operating time M at step 417, it is judged that there has been no intrusion into the passenger compartment of the vehicle during the current operating time M so that the process proceeds to step 418 where the count number D is cleared to zero.

When the process proceeds from step 418 or step 421 to step 422, an OFF command is output to the analog switch 81 to turn OFF the analog switch 81. By this operation, the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 are cut off from the battery B to stop their operations. At the same time, the microcomputer 90 itself assumes its sleep mode, i.e., a low current consumption mode.

After this, based on the trigger pulse outputs from the trigger circuit 131, the above-described processes by the microcomputer 90 are repeated, and when the judgement at step 419 is "YES", the process proceeds to step 152 in FIG. 5. Then, in FIG. 5, when an alarm is inhibited at step 152 in FIG. 5, a process to turn OFF the analog switch 81 is carried out.

As described above, according to this second embodiment, based on the process by the microcomputer 90 which is operated at the output interval (predetermined period P) of the trigger pulse form the trigger circuit 131, the power supply from the battery B to the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 is effected only during the operating time M in the predetermined period P.

Thus, the intrusion detecting apparatus of an ultrasonic doppler type according to this second embodiment operates intermittently at each operating time M in the predetermined period P. Therefore, even when the vehicle is in a stopped state, the power consumption of the battery B which is necessary to perform the above operation can be greatly reduced in comparison with the power consumption necessary to continuously operate the intrusion detecting apparatus.

Also, even when the above-mentioned intermittent operation is effected, since the operating time M and the detecting time T2 are set as mentioned above, the calculation of the period T of the doppler shift signal at step 415 and the judgement of whether or not there is an illegal intrusion at step 416 can be correctly carried out.

Next, modifications of the above-described second embodiment will be described with reference to FIGS. 16, 17A and 17B.

Figure 16:
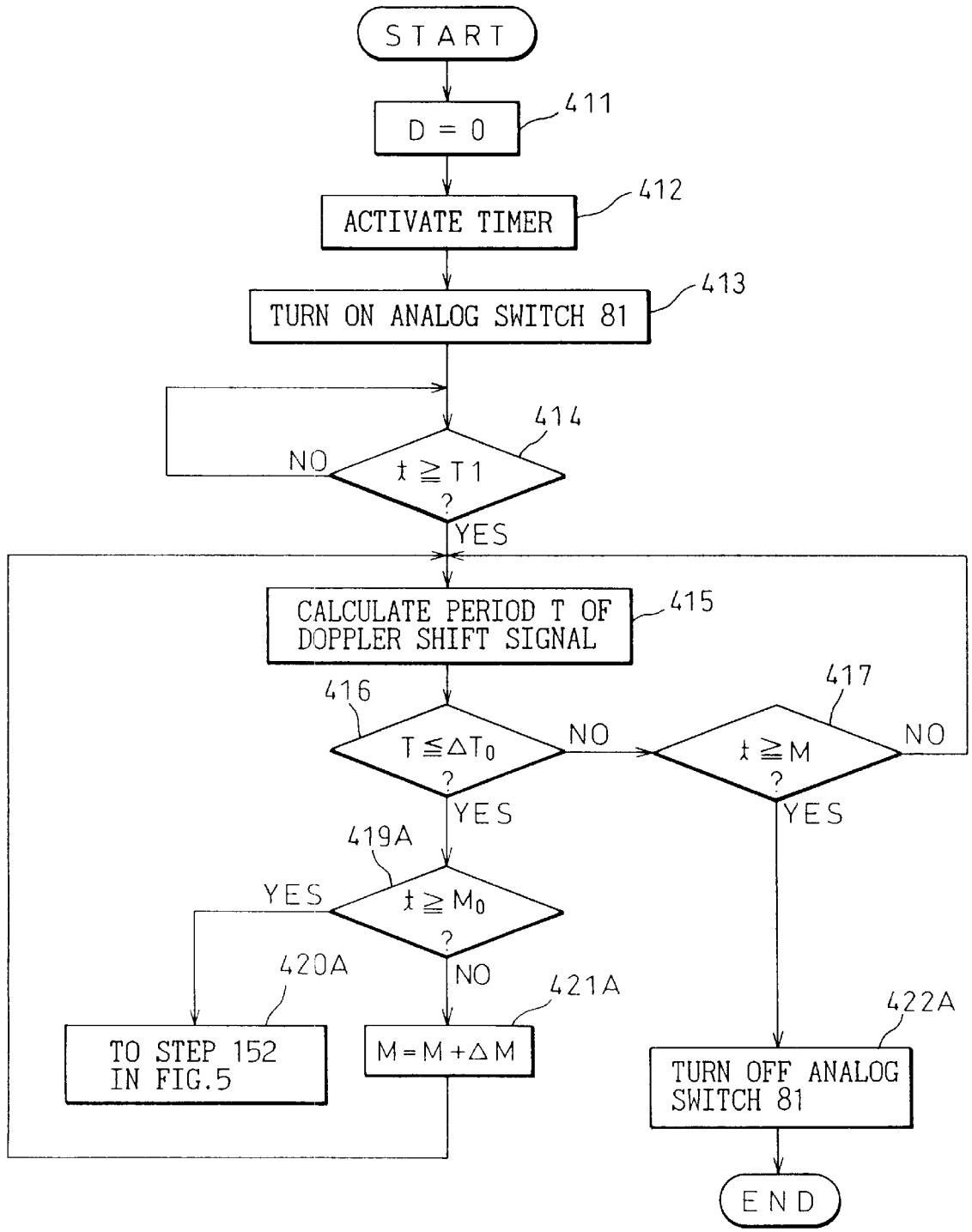
FIG. 16 is a flowchart showing a second example of the operation of a microcomputer in the apparatus shown in FIG. 13.
Figure 17A:
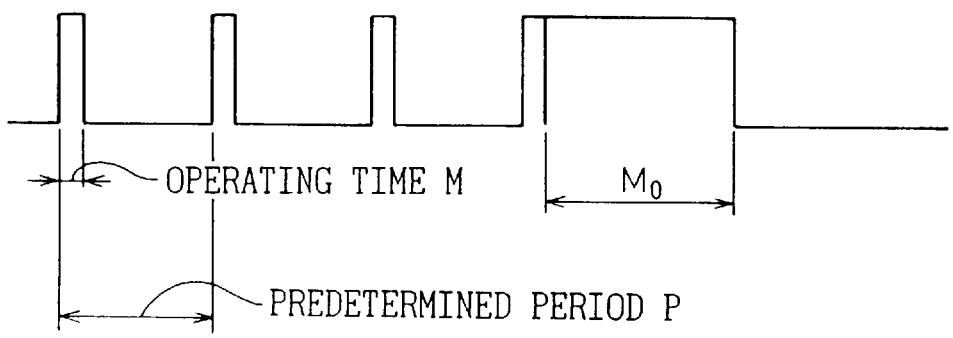
FIG. 17A is a timing chart showing an intermittent operation in the operation shown in FIG. 15 when an alarm is generated.

FIG. 16 is a flowchart explaining the operation of the microcomputer according to another example of the second embodiment of the present invention. In FIG. 16, steps 419A, 420A, 421A, and 422A are different from steps 419, 420, 421, and 422 in FIG. 14, respectively, but the other steps in FIG. 16 are the same as those in FIG. 14.

Figure 17B:
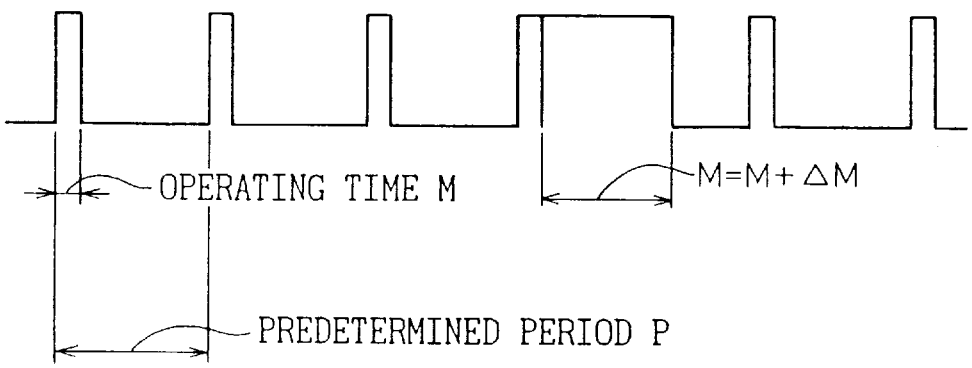
FIG. 17B is a timing chart showing an intermittent operation in the operation shown in FIG. 15 when an alarm is not generated.

In FIG. 16, at step 416, when the period T of the doppler shift signal is not within the predetermined frequency range $\Delta T_0$, it is judged that there is no intrusion of a person into the passenger compartment of the vehicle so that the process proceeds to step 417 where the judgement is "NO" because the count value t is smaller than the extended operating time M (see FIG. 17B).

Then steps 415 through 417 are repeated until the judgement at step 416 becomes "YES". When the judgement at step 416 becomes "YES", it is tentatively judged that a person has intruded into the passenger compartment of at the vehicle so that the process proceeds to step 419A, where it is judged whether or not the count value t has reached a predetermined continuous time $M_0$. This continuous time $M_0$ represents a time in which it can be correctly judged that a person has surely intruded, taking an error judgement of "YES" at step 123 due to external noise into account.

When the count value t is shorter than a predetermined continuous time $M_0$, the judgement at step 419A becomes "NO" so that the process proceeds to step 421A where the operating time M is extended by ΔM, where ΔM represents a predetermined extending time to be added to the previous operating time M.

Then, while the process through steps 415, 416, and 417 or the process through steps 415, 416, 419A and 421A is repeated, when the judgement at step 416 becomes "NO", and then when the judgement at step 417 becomes "YES" (see FIG. 17B), it is judged that there has been no intrusion into the passenger compartment of the vehicle during the above-mentioned continuous time $M_0$ so that the process proceeds to step 422A where the analog switch 81 is turned OFF by sending an OFF command to the analog switch 81.

Thus, the ultrasonic transmitter 10a, the driving circuit 20, the oscillating circuit 30, the ultrasonic receiver 10b, the amplifier 40, the comparing circuit 50, the phase difference output circuit 60 and the BPF 70 are cut off from the power supply from the battery B so that these operations are stopped. After this, the above-mentioned processes are repeated based on the output from a new trigger pulse from the trigger circuit 131.

On the other hand, when the judgement at step 416 becomes "YES", and then when the count value t reaches the predetermined continuous time $M_0$, the judgement at step 419A becomes "YES" so that the process proceeds to step 420A where the process proceeds to step 152 in FIG. 5 in the similar way as that in the above-described second embodiment.

As described above, according to the first and the second examples of the second embodiment of the present invention, based on the process by the microcomputer 90 which is driven intermittently at output intervals (predetermined period P) by the trigger pulses from the trigger circuit 131, the power supply from the battery B to the ultrasonic transmitter 10b, the amplifying circuit 40, the comparing circuit 50, the phase difference output circuit 60 and the BPF 70 are effected only during the operating time M within the predetermined period P.

Therefore, the intrusion detecting apparatus according to the second embodiment of the invention operates intermittently in each operating time M within the predetermined period P so that the power consumption of the battery B necessary to effect these operation can be greatly reduced in comparison with the power consumption B necessary to continuously operate the intrusion detecting apparatus.

It should be noted that, in the above-described second example of the second embodiment, under the intermittent operation, each time after the judgement of "YES" at step 416, and when the judgement at step 419A is "NO", the operating time M is extended by ΔM. Therefore, the judgement at step 419A becomes "YES" only when the count value t reaches to the predetermined continuous time $M_0$ after the continuous judgements of the person's intrusion within the extended operating time M. This means that the judgement of an illegal intrusion can be correctly effected without any error judgement. The other effects are the same as those in the previous embodiments.

In the above-described first and the second embodiments, the intrusion detecting apparatus for a vehicle is of an ultrasonic doppler type, however, the present invention is not restricted to this, but may be applied to an intrusion detecting apparatus for a vehicle of an ultrasonic amplitude modulation type or an ultrasonic pulse radar type.

Further, each step in each flowchart of the first or the second embodiment may be realized by a hard logic construction for performing the same function as that of the steps in the flowcharts.

What is claimed is:

1. An intrusion detecting apparatus for a vehicle comprising:

ultrasonic transmitting means, provided in a passenger compartment of a vehicle, for transmitting an ultrasonic signal to be reflected in said passenger compartment;

ultrasonic receiving means, provided in said passenger compartment, for receiving an ultrasonic signal reflected in said passenger compartment;

doppler shift signal outputting means for outputting a doppler shift signal in response to said reflected and received ultrasonic signal from said ultrasonic receiving means and said transmitted ultrasonic signal from said ultrasonic transmitting means;

receiving signal level detecting means for detecting the level of said received ultrasonic signal;

first determining means for determining whether said doppler shift signal is within a predetermined amount corresponding to a movement of a person intruding into said passenger compartment;

second determining means for determining whether the level of said received ultrasonic signal detected by said receiving signal level detecting means is out of a range of a disturbance,
  wherein said range of a disturbance is set to be a range in which said detected level of said received ultrasonic signal changes due to at least air turbulence in said passenger compartments,
  wherein said receiving signal level detecting means comprises calculating means for repeatedly differentiating said received ultrasonic signal with respect to time and for summing the absolute values of the differentiated values, and
  wherein said second determining means determines whether the sum of the absolute values of the differentiated values is out of a range representing said air turbulence; and detecting means for detecting an illegal intrusion by a person only when said first determining means determines that said doppler shift signal is within said predetermined amount and said second determining means determines that the detected level of said received ultrasonic signal is out of said range.

2. An intrusion detecting apparatus for a vehicle comprising:

ultrasonic transmitting means, provided in a passenger compartment of a vehicle, for transmitting an ultrasonic signal to be reflected in said passenger compartment;

ultrasonic receiving means, provided in said passenger compartment, for receiving an ultrasonic signal reflected in said passenger compartment;

doppler shift signal outputting means for outputting a doppler shift signal in response to said reflected and received ultrasonic signal from said ultrasonic receiving means and said transmitted ultrasonic signal from said ultrasonic transmitting means;

receiving signal level detecting means for detecting the level of said received ultrasonic signal;

first determining means for determining whether said doppler shift signal is within a predetermined amount corresponding to a movement of a person intruding into said passenger compartment;

second determining means for determining whether the level of said received ultrasonic signal detected by said receiving signal level detecting means is out of a range of a disturbance;

detecting means for detecting an illegal intrusion by a person only when said first determining means determines that said doppler shift signal is within said predetermined amount and said second determining means determines that the detected level of said received ultrasonic signal is out of said range;

control means for intermittently supplying power for a predetermined time period to at least one of said ultrasonic transmitting means, said ultrasonic receiving means, said doppler shift signal outputting means, and said receiving signal level detecting means; and extending means for extending said predetermined time period of said control means when said first determining means determines that said doppler shift signal is within said predetermined amount.

3. An intrusion detecting apparatus as claimed in claim 1 or 2, wherein said predetermined amount is a predetermined range of frequency and said first determining means determines whether a frequency of said doppler shift signal is within said predetermined range of frequency.

4. An intrusion detecting apparatus as claimed in claim 1 or 2, wherein said first determining means determines, during a predetermined period corresponding to an intrusion of a person into said passenger compartment, whether said doppler shift signal is within said predetermined amount corresponding to a movement of a person intruding into said passenger compartment.

5. An intrusion detecting apparatus as claimed in claim 1, or 2, wherein said first determining means determines, at least at the beginning and at the end of a predetermined period corresponding to an intrusion of a person into said passenger compartment, whether said doppler shift signal is within said predetermined amount corresponding to a movement of a person intruding into said passenger compartment.

6. An intrusion detecting apparatus as claimed in claim 1 or 2, wherein said ultrasonic transmitting means and said ultrasonic receiving means are provided on a central portion of an upper edge of a front windshield in said passenger compartment.

7. An intrusion detecting apparatus as claimed in claim 1 or 2, wherein said passenger compartment contains at least one seat belt pillar, and wherein said ultrasonic transmitting means and said ultrasonic receiving means are provided on an upper portion of each seat belt pillar in said passenger compartment.

8. An intrusion detecting apparatus as claimed in claim 2, wherein said control means includes switching means for intermittently disconnecting said at least one of said ultrasonic transmitting means, said ultrasonic receiving means, said doppler shift signal outputting means, and said receiving signal level detecting means from a power supply.

9. An intrusion detecting apparatus for a vehicle, comprising:

ultrasonic transmitting means, provided in a passenger compartment of a vehicle, for transmitting an ultrasonic signal to be reflected in said passenger compartment;

ultrasonic receiving means, provided in said passenger compartment, for receiving an ultrasonic signal reflected in said passenger compartment;

doppler shift signal outputting means for outputting a doppler shift signal in response to said reflected and received ultrasonic signal from said ultrasonic receiving means and said transmitted ultrasonic signal from said ultrasonic transmitting means;

receiving signal level detecting means for detecting the level of said received ultrasonic signal;

first determining means for determining whether said doppler shift signal is within a predetermined amount corresponding to a movement of a person intruding into said passenger compartment, wherein said predetermined amount is a predetermined range of period and said first determining means determines whether a period of said doppler shift signal is within said predetermined range of period;

second determining means for determining whether the level of said received ultrasonic signal detected by said receiving signal level detecting means is out of a range of a disturbance;

detecting means for detecting an illegal intrusion by a person only when said first determining means determines that said doppler shift signal is within said predetermined amount and said second determining means determines that the detected level of said received ultrasonic signal is out of said range;

control means for intermittently supplying power for a predetermined time period to at least one of said ultrasonic transmitting means, said ultrasonic receiving means, said doppler shift signal outputting means, and said receiving signal level detecting means; and extending means for extending said predetermined time period of said control means when said first determining means determines that said doppler shift signal is within said predetermined amount.

10. An intrusion detecting apparatus for a vehicle, comprising:

ultrasonic transmitting means, provided in a passenger compartment of a vehicle, for transmitting an ultrasonic signal to be reflected in said passenger compartment;

ultrasonic receiving means, provided in said passenger compartment, for receiving an ultrasonic signal reflected in said passenger compartment;

doppler shift signal outputting means for outputting a doppler shift signal in response to said reflected and received ultrasonic signal from said ultrasonic receiving means and said transmitted ultrasonic signal from said ultrasonic transmitting means;

receiving signal level detecting means for detecting the level of said received ultrasonic signal;

first determining means for determining whether said doppler shift signal is within a predetermined amount corresponding to a movement of a person intruding into said passenger compartment;

second determining means for determining whether the level of said received ultrasonic signal detected by said receiving signal level detecting means is out of a range of a disturbance;

detecting means for detecting an illegal intrusion by a person only when said first determining means determines that said doppler shift signal is within said predetermined amount and said second determining means determines that the detected level of said received ultrasonic signal is out of said range;

control means for intermittently supplying power for a predetermined time period to at least one of said ultrasonic transmitting means, said ultrasonic receiving means, said doppler shift signal outputting means, and said receiving signal level detecting means; and extending means for extending said predetermined time period of said control means when said first determining means determines that said doppler shift signal is within said predetermined amount, wherein the determination effected by said first determining means is effected only after said second determining means determines that the detected level of said received ultrasonic signal is out of said range of a disturbance.

* * * * *